R. E. DUNHAM.
METHOD OF FORMING SHEET METAL CYLINDERS.
APPLICATION FILED FEB. 19, 1914.

1,248,831.

Patented Dec. 4, 1917.

Witnesses:
Herman Eisele
D. M. Prudling

Inventor:
Ray E. Dunham,
by A. E. Merkel,
his Attorney

UNITED STATES PATENT OFFICE.

RAY E. DUNHAM, OF BEREA, OHIO, ASSIGNOR TO THE DUNHAM COMPANY, OF BEREA, OHIO, A CORPORATION OF OHIO.

METHOD OF FORMING SHEET-METAL CYLINDERS.

1,248,831.  Specification of Letters Patent.  Patented Dec. 4, 1917.

Application filed February 19, 1914. Serial No. 819,695.

*To all whom it may concern:*

Be it known that I, RAY E. DUNHAM, a citizen of the United States, resident of Berea, county of Cuyahoga, and State of Ohio, have invented a new and useful Improvement in Methods of Forming Sheet-Metal Cylinders, of which the following is a specification, the principle of the invention being herein explained and the best mode in which I have contemplated applying that principle, so as to distinguish it from other inventions.

My invention relates to methods of forming sheet-metal cylinders, its object being to effect such formation in an efficient and economical manner.

My said invention relates more specifically to and is peculiarly adapted for use in connection with the formation of sheet metal cylinders whose outer surfaces are required to be true or practically true cylindrical surfaces, such as for instance, is the case in the drums or cylinders of lawn or land rollers, and particularly where such rollers are to be used for rolling tennis courts.

In order to be acceptable for rolling tennis courts, the outer surfaces of the rollers should be smooth, without ridges or other superficial inequalities and truly cylindrical in form, as will be readily understood by those skilled in the art.

Heretofore it has been the practice in forming the outer or cylindrical shell of the drum of such roller, to take a sheet of steel of suitable dimensions, pass it between suitable rollers to bend it into cylindrical form, then bring the longitudinal edge-portions into abutting contact, and then fuse or weld these abutting ends to each other by the application to the outside or convex surfaces near the abutting surfaces, of a welding or fusing temperature, usually by means of an oxyacetylene flame. This fusing or welding together of these ends is ordinarily assisted by the simultaneous application of "welding iron" to the joint, such application being similar to the use of solder in the ordinary soldering process.

Such practice results in the formation upon the outer surface of the cylinder, of a longitudinal rough ridge of metal, which in order to make the roller in which the drum is to be used, conform to the commercial requirements, must be removed. Such removal involves an expensive operation, the elimination of which is economically desirable and advantageous.

A specific object of my invention is therefore to effect the union of such abutting surfaces without the formation of such ridge and to in that way perform a minimum number of operations in the course of manufacture.

My said invention consists of a method hereinafter fully described and particularly set forth in the claims.

Figure 3:
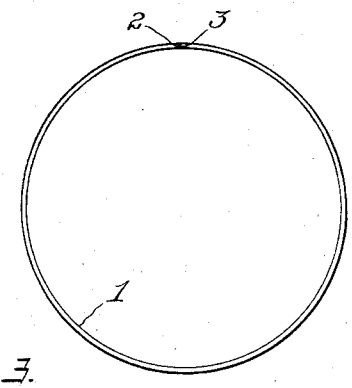
Fig. 3 represents an end view of the sheet rolled into the cylindrical form with the longitudinal ends abutting but not united.
Figure 4:
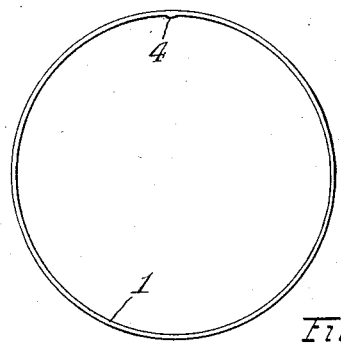
Fig. 4 represents an end view of the completed cylinder.
Figure 2:
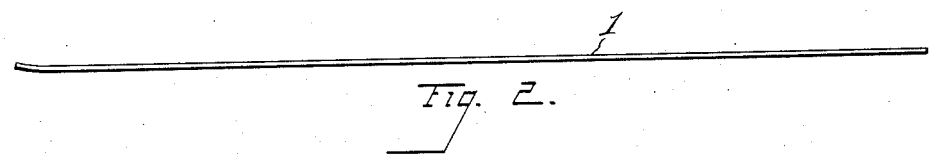
Fig. 2 represents a similar view showing the form of the sheet after the first step in the formation of the drum is completed.
Figure 1:
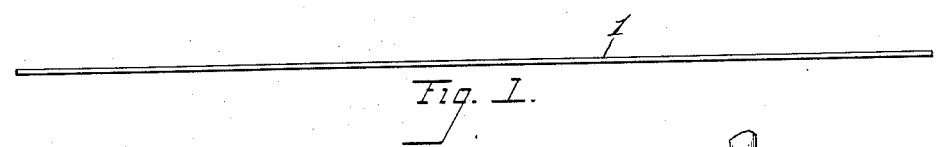
Figure 1 represents an end view of a sheet of steel used in constructing a lawn-roller drum.
Figure 5:
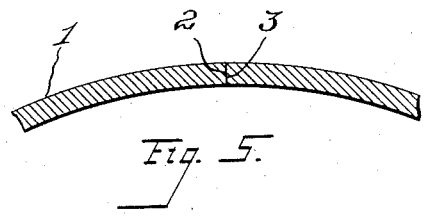
Fig. 5 represents a fragmentary portion on an enlarged scale of the ununited abutting end-portions of the cylinder.

In carrying out the process embodying my invention, the sheet 1, is first passed through suitable rolls (not shown) and in a manner well known to those skilled in the art, to form a cylindrical shell with the free ends abutting as shown in Fig. 3. In order to make the shell truly cylindrical, one end is, however, first bent into curved form before passing through such rolls, as shown in Fig. 2, that end first passing through the rolls being so bent. This preliminary bending is effected by any suitable means (not shown) preferably by means of properly adjusted rolls or dies.

Figure 6:
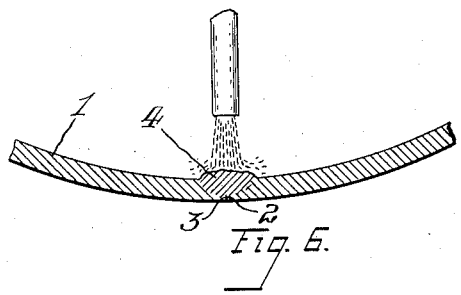
Fig. 6 represents a similar fragmentary section showing the partial union of said end-portions.

The sheet having been manipulated as above described, an oxy-acetylene flame is then directed upon the exposed inner or concave surfaces which are adjacent to the inner end of the abutting surfaces 2 and 3, as shown in Fig. 6, and the welding or fusing temperature so produced applied until the corresponding metal fuses and the zone of fusion extends outwardly to almost but not quite the other and outer end of such abutting surfaces. Welding iron may be used in said described operation in the usual manner. An almost complete joint will thus be formed with an inner longitudinal ridge or mass 4 acting as a reinforcement, the outer surface of the shell being, however, undisturbed.

Figure 7:
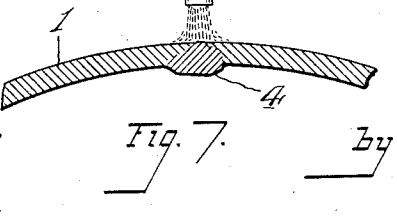
Fig. 7 is a similar section showing the completed joint.

The flame is then directed to the outside or convex surface along the outer ends of the abutting surfaces, and the metal fused until the joint is complete. The ununited metal upon the outside being of small mass, the final fusing operation is performed with little disturbance to the metal and the use of only a small amount of "welding iron," with the result that the continuity of the cylindrical outer contour is only slightly disturbed and is hence a negligible quantity, as shown in Fig. 7.

A shell is thus formed having the previously described characteristics of outer contour.

Having fully described my invention, what I claim and desire to secure by Letters Patent is:—

1. In a method of forming sheet-metal cylinders, the steps which consist in bringing two sheet-ends into abutting contact; subjecting the exposed surfaces of metal which are adjacent to one end of the abutting surfaces to a welding temperature until the weld extends to a point near the opposite end of said abutting surfaces and well through the seam; and then subjecting the metal adjacent to said opposite end to a fusing temperature until all of the metal adjacent to said abutting surfaces is fused.

2. The method of forming sheet-metal cylinders which consists in bending a sheet into cylindrical form; bringing the two longitudinal ends into abutting contact; then subjecting the metal upon the concave side of the sheet and which is adjacent to the contacting surfaces, to a fusing temperature until a weld nearly through the joint is formed; and finally subjecting the metal upon the convex side to a fusing temperature until the joint is completed.

3. The method of forming smooth surfaced hollow cylinders, which consists in bending a smooth surfaced sheet into cylindrical form with the ends abutting, welding together said sheet from the interior, with a welding flame, until the weld reaches almost through the seam, and then completing the weld from the exterior by means of a similar flame, whereby a smooth surfaced cylinder having little or no seam is produced.

Signed by me, this 17th day of February, 1914.

RAY E. DUNHAM.

Attested by—
A. F. EHRBAR,
H. D. MATTISON.